United States Patent
Moslehi

Patent Number: 5,436,494
Date of Patent: Jul. 25, 1995

[54] TEMPERATURE SENSOR CALIBRATION WAFER STRUCTURE AND METHOD OF FABRICATION

[75] Inventor: Mehrdad M. Moslehi, Dallas, Tex.

[73] Assignee: Texas Instruments Incorporated, Dallas, Tex.

[21] Appl. No.: 180,251

[22] Filed: Jan. 12, 1994

[51] Int. Cl.$^6$ ............................................. H01L 37/00
[52] U.S. Cl. ................................. 257/467; 257/537; 338/308
[58] Field of Search ...................... 257/467, 468, 537; 338/308, 319

[56] References Cited

U.S. PATENT DOCUMENTS 4,059,774  11/1977  Cahen .................................. 257/467
4,696,188  9/1987  Higashi .............................. 257/467

Primary Examiner—Jerome Jackson
Assistant Examiner—Donald L. Monin, Jr.
Attorney, Agent, or Firm—Mark A. Valetti; Carlton H. Hoel; Richard L. Donaldson

[57] ABSTRACT

An embodiment of the present invention relates to a semiconductor wafer structure, the wafer structure comprising: a semiconductor substrate; a plurality of temperature sensing elements (12) disposed over the semiconductor substrate, where temperature sensing elements (12) are fabricated so that an electrical characteristic of the temperature sensing element changes as the temperature of the wafer changes; and a plurality of interconnection lines (10, 14) connecting the temperature sensing elements (12) to external devices. In addition the semiconductor wafer structure includes a passivation layer which is deposited over the semiconductor substrate and the temperature sensing elements. The temperature sensing elements are comprised of a refractory conductor, the refractory conductor has a temperature dependent electrical resistivity and has a width much less than its length. The interconnection lines are comprised of a conductor, and the conductor has a width which is greater than the width of the refractory conductor of the temperature sensor conductor. One or more electrical characteristic of the temperature sensing elements changes with temperature. These electrical characteristic could be either: conductor resistance, dielectric capacitance, diode characteristics, or inductance.

1 Claim, 2 Drawing Sheets

TEMPERATURE SENSOR CALIBRATION WAFER STRUCTURE AND METHOD OF FABRICATION

FIELD OF THE INVENTION

This invention relates, in general, to a temperature calibration device for semiconductor processing and particularly to a semiconductor wafer operable to measure the temperature of the wafer at predetermined points and a method of fabricating the semiconductor wafer with temperature calibration sensors.

BACKGROUND OF THE INVENTION

Wafer temperature is an important process parameter in many semiconductor fabrication processes including rapid thermal processing ("RTP"). Numerous semiconductor device thermal fabrication processes employ noninvasive temperature sensors which require calibration in reference to reliable and repeatable standards. An important group of device fabrication processes is rapid thermal processing. Most of the RTP reactors employ non-contact single-point or multi-point pyrometry for wafer temperature measurement and control. However, the accuracy and repeatability of RTP temperature measurements by pyrometry depend strongly on the wafer emissivity. In practice, frequent pyrometry sensor calibrations are required in order to obtain acceptable process repeatability and uniformity. These frequent cross-calibrations are usually performed by placing separate standard calibration wafers with bonded thermocouples (herein after referred to as "TC-bonded wafers") in the process chamber. However, these commercially available calibration wafers have numerous drawbacks.

First, TC-bonded wafers are fabricated using a long and expensive manual process. The fabrication process includes drilling holes in the silicon wafer to place the thermocouple junction. Then a ceramic glue is used to secure the thermocouple junctions. As a result, the TC-bonded wafers are rather expensive. In addition, the cost to fabricate these wafers dramatically increases with the number of bonded thermocouples required on a wafer. Calibration wafers with multiple sensing elements are required to monitor and adjust process uniformity.

Second, wafers with bonded thermocouples have limited lifetime for high-temperature calibration applications. This limited lifetime problem is even worse when the calibration procedures are performed in reactive ambients such as oxygen. As a result, a TC-bonded calibration wafer may survive only for a few, typically less than 20, calibration runs before the thermocouple junction degrades. This makes the effective temperature calibration cost relatively high.

Third, bonded thermocouples result in thermal loading of the wafer due to the thermal mass of the thermocouple junctions and the thermocouple wires connected to the junction. This can result in disturbance of the wafer temperature at the thermocouple junction locations.

Fourth, TC-bonded wafers with multiple thermocouples contain wires distributed over the wafer. These wires typically extend over the entire wafer surface, when multiple thermocouples are utilized, and can cause disturbance of wafer temperature distribution and make wafer handling difficult.

It is an object of the present invention to provide a means for calibrating thermally activated fabrication processes that are reliable, cost-effective, and accurate. In conjunction with these objectives, it is also an objective of the present invention to provide a temperature calibration device that has an extended lifetime, as compared to TC-bonded wafers. Moreover, another object of this invention is to provide a temperature calibration device with as many temperature calibration elements as required. Further objects and advantages of the invention will become apparent to those of ordinary skill in the art having reference to the following specification together with the drawings.

SUMMARY OF THE INVENTION

An embodiment of the present invention relates to a semiconductor wafer structure, the wafer structure comprising: a semiconductor substrate; a plurality of temperature sensing elements disposed over the semiconductor substrate, the temperature sensing elements fabricated so that an electrical characteristic of the temperature sensing element changes as the temperature of the wafer changes; and a plurality of interconnection lines connecting the temperature sensing elements to external devices. In addition the semiconductor wafer structure includes a passivation layer which is deposited over the semiconductor substrate and the temperature sensing elements. The temperature sensing elements are comprised of a refractory conductor, the refractory conductor has a temperature dependent electrical resistivity and has a width much less than its length. The interconnection lines are comprised of a conductor, and the conductor has a width which is greater than the width of the refractory conductor of the temperature sensor conductor.

One or more electrical characteristic of the temperature sensing elements changes with temperature. These electrical characteristic could be either: conductor resistance, dielectric capacitance, diode characteristics, or inductance.

Another embodiment of the present invention is a semiconductor wafer comprising: integrated temperature sensors thereon; and integrated interconnection lines connected to the temperature sensor. The temperature sensor may be a resistor, a capacitor, an inductor, or a diode, which have electrical characteristics that change with temperature. The semiconductor wafer includes: a substrate, a patterned conductive layer overlying the substrate, and a protective coating overlying exposed portions of the substrate and the patterned conductive layer. The interconnection lines are formed from the patterned conductive layer and have a width, and the temperature sensors are formed from the patterned conductor and have a line width and a line length. In addition, the line width of the temperature sensors is much less then the line width of the interconnection lines.

DETAILED DESCRIPTION OF PREFERRED EMBODIMENTS

The instant invention is a calibration wafer with one or more temperature sensing elements and fabrication process for making the same. This invention overcomes most of the limitations and problems associated with thermocouple calibration wafers. The cost of a calibration wafer utilizing the methods and structure of the instant invention is much less than the cost of calibration wafers utilizing conventional bonded thermocouples. Moreover, the cost of a calibration wafer utilizing this invention is relatively independent of the number of sensing elements fabricated on the wafer. Whereas, the cost of a calibration wafer utilizing conventional bonded thermocouples increases rapidly with the number of bonded thermocouples that are utilized.

The calibration wafers of the present invention provide much longer lifetime in both inert and reactive ambients than the TC-bonded wafers. This invention allows many more sensing elements distributed over the calibration wafer (up to 50 or more) compared to the TC-bonded calibration wafer technology, at a small fraction of the fabrication cost. For instance, this invention allows fabrication of calibration wafers with ten's of sensing elements at a cost which is at least one order of magnitude less than the cost of commercial TC-bonded wafers, which utilize far fewer temperature sensing elements.

In addition, the structures of the present invention provide much less thermal loading of the calibration wafer then the TC-bonded wafer. The significant reduction in thermal loading is due to two factors. First, a bonded thermocouple requires a greater physical area and a much more massive sensor element than the structure of the present invention. This is due to the relatively large thermal mass of the thermocouple and the adhesive required to bond the thermocouple to the wafer. Second, the means of connecting the temperature measuring structure of the present invention to the input devices of external measurement equipment are thin conductive lines formed on the wafer using standard silicon fabrication processes. In contrast, the TC-bonded wafers use wires to connect the thermocouples to the external measurement equipment. These thermocouple connection wires add to the thermal loading of the TC-bonded wafers.

Figure 1:
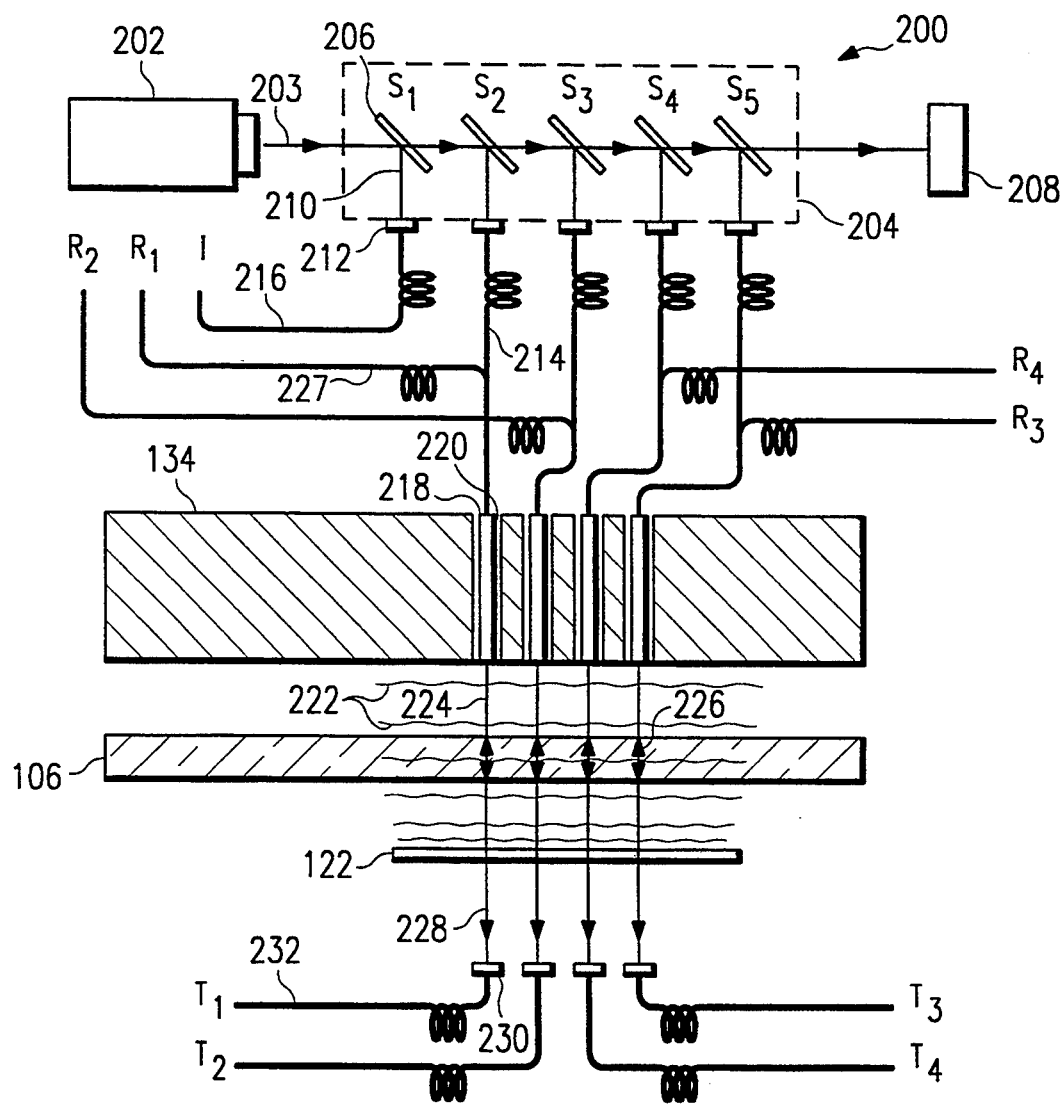
FIG. 1 is a cross-sectional view of a environment in which the present invention may be utilized.

FIG. 1 is a schematic drawing illustrating an environment in which the instant invention can be used. In the discussions that follow, the detailed description refers to only one path for signal flow. Infrared CO laser 202 provides a coherent incident beam 203 to beam splitter module 204. Beam splitter module 204 contains beam splitters S1 through S5 which split coherent incident beam 203 into five coherent beams with essentially equal intensities. For example, coherent beam 210 has equal intensity to all other beams split by beam splitter module 204. Infrared fiber connector 212 receives coherent beam 210 and sends it into fiber 216. Remaining infrared laser energy from beam splitter S5 exits beam splitter module 204 and is absorbed by absorber 208. From infrared fiber connector 212 coherent beam 210 travels through optical fiber 216. Optical fiber 216 is used to measure an incident coherent beam power level, I. Optical fiber 214, however, leads directly to fiber bundle 218. Other types of beam splitters may be used instead of the design shown in FIG. 1.

Fiber-optic bundle 218 fits within bore 220 of lamp module 134. From fiber-optic bundle 218 incident coherent beam 224 is emitted through optical window 106. After traveling through optical window 106, incident coherent beam 224 is incident upon semiconductor wafer 122. A portion of incident coherent beam 224 is reflected to become reflected coherent beam 226. A portion of incident coherent beam 224 is transmitted through wafer 122 to become transmitted coherent beams 228. Fiber-optic termination 230 receives transmitted coherent beam 228 which travels through optical fiber 232 to become transmitted beam outputs T1.

The portion of incident coherent beam 224 that semiconductor wafer 122 reflects is returned to fiber-optic bundles 218. Additionally, because of the elevated temperature to which lamp module 134 takes semiconductor wafer 122, semiconductor wafer 22 also emits incoherent radiant energy 222. Fiber-optic bundle 218 receives reflected coherent beams and incoherent radiant energy and directs these signals to optical fibers 227 to become received signals R1.

Sensor 200 of the present invention provides multipoint temperature sensing of semiconductor wafer 122 with a real-time emissivity measurement. The real-time emissivity measurements are used for real-time emissivity compensation and extraction of true wafer temperature. Infrared laser 202, in the preferred embodiment, comprises a CO laser, however other forms of optical energy may be used to achieve the purposes of the present invention. Lamp module 134 comprises an array of tungsten-halogen lamps used to heat the face-down semiconductor wafer 122. Lamp module 134 has a plurality of hollow light pipes designed to receive fiber-optic bundles 218. The typical diameter of bore 220 ranges from $\frac{1}{8}$ to $\frac{1}{4}$, other diameters may be used, depending on the desired dimension of each of the fiber-optic bundles 218 and other characteristics associated with lamp module 134 and semiconductor wafer 122.

Optical vacuum window 106 separates lamp module 134 and fiber-optic bundles from semiconductor wafer 122. Additionally, optical window 106 not only serves to transfer wafer heating flux and coherent laser energy between wafer 122 and fiber-optic bundles 218, but also maintains a controlled process environment or vacuum within the process chamber for processing semiconductor wafer 122. Optical window 106 is optically transparent for both the lamp energy from lamp module 134 and incident coherent laser beam 224 and reflected coherent beam 226. Optical transparency is a function of the window material and the wavelength of the optical energy passing through optical window 106 so the material for window 106 is selected with optical transparency in the desired band as an essential criterion.

The number of laser beam outputs from beam splitter module 204 equals the number of points at which semiconductor wafer 22 is to be measured or, equivalently, the number of fiber-optic bundles 218, plus a reference output I. In a preferred case, the reference output would be four, so beam splitter module 204 splits output beam from laser 202 into five output beams having essentially equal output power or intensity levels.

The above relates to the temperature calibration wafer of the instant invention in that the calibration wafer would be used in place of semiconductor wafer 122 to calibrate the system. Thereby, the calibration sensor would be used to calibrate the temperature sensors of measuring apparatus 200.

Figure 2:
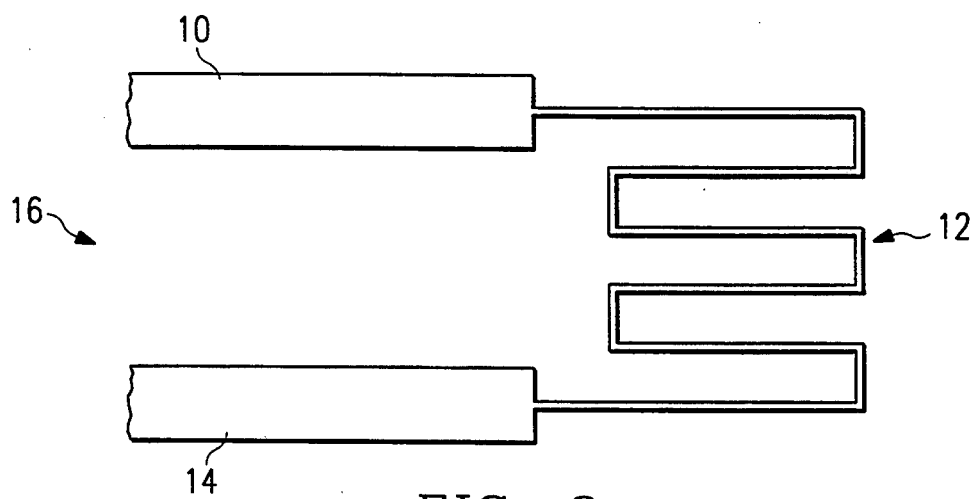
FIG. 2 is an illustration of an embodiment of the present invention.

Referring to FIG. 2, the instant invention is based on an array of resistive elements 16 made of a suitable material, preferably tungsten silicide. Tungsten silicide is considered to be a suitable material because the resistivity of tungsten silicide changes with temperature and it can tolerate very high temperatures. Therefore, a variation of resistivity of $WSi_x$, due to a change in substrate temperature, can be used to determine the precise temperature of a wafer at the location of sensor 16. The ratio of electrical resistance measured at any temperature to the resistance at room temperature relates to temperature of the elements. A typical top view of the resistive element layout is shown in FIG. 2.

Sensor 16 is comprised of feed lines 10 and 14 and sensor element 12. Feed lines 10 and 14 are fabricated on the order of 1 millimeter wide. Sensor element 12 is made of $WSi_x$ and is on the order of 0.5 micrometers wide and several millimeters to several centimeters long. The total area of resistive element 12 can be made to be less than 1 mm².

Figure 3:
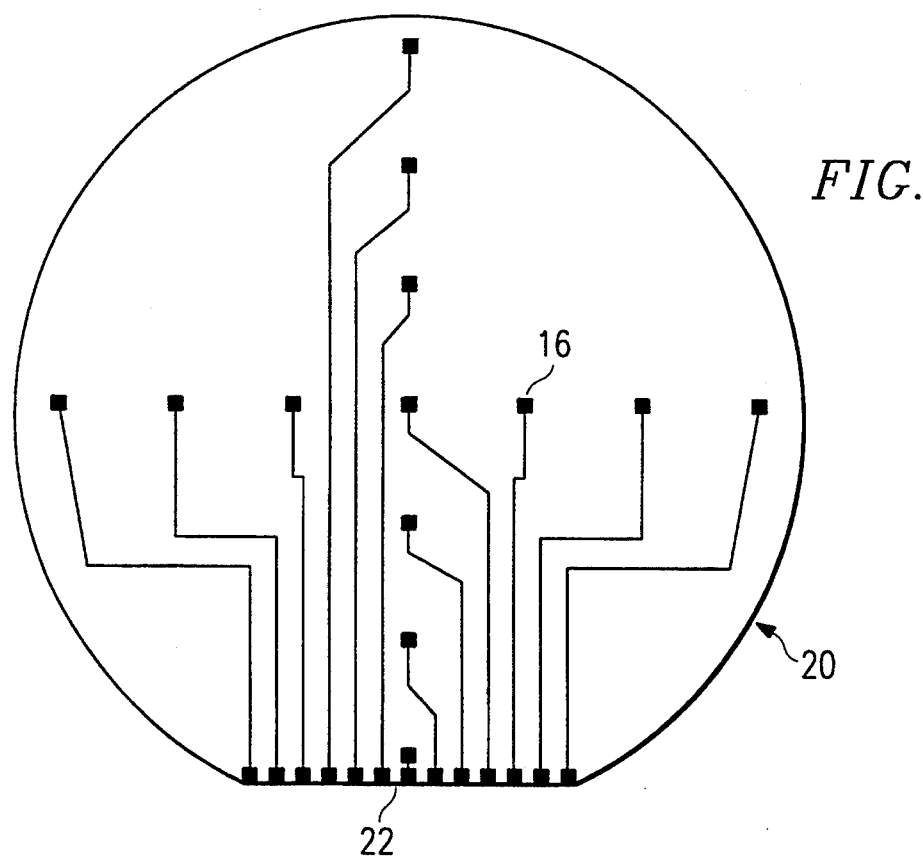
FIG. 3 is a top view of a semiconductor wafer which utilizes the present invention.

FIG. 3 illustrates an embodiment of the present invention. In the embodiment illustrated in FIG. 3, sensor elements 12 are distributed along two diameters of the wafer. This configuration facilitates measuring the temperature, in both the x- and y-directions, across the entire wafer surface. Sensor elements 12 of FIG. 2 are illustrated in FIG. 3 by solid circles, and feed lines 10 and 14 are represented in FIG. 3 as one solid line. Though this is not a completely accurate illustration of the sensor elements and their corresponding feed lines, FIG. 2 is meant to illustrate an example of the potential placement of sensor elements 16 and the location on the wafer (preferably flat side 22 of the wafer) in which they connect to external connection wires.

Figure 4A:
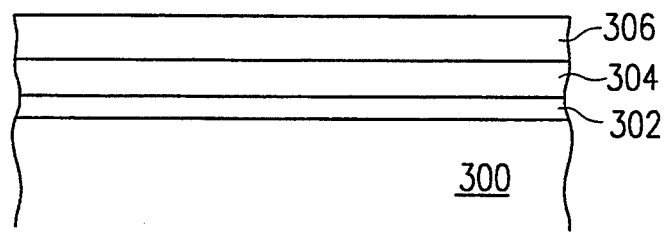
FIGS. 4a–c are cross-sectional diagrams of a temperature calibration wafer according to an embodiment of the present invention in various states of device fabrication.
Figure 4B:
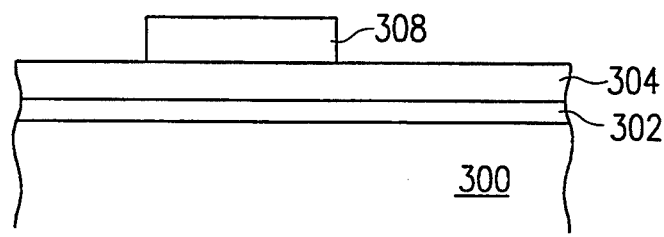
Figure 4C:
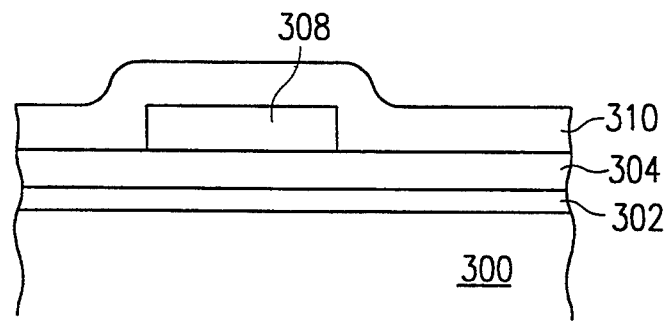

Referring to FIGS. 4a–c, another embodiment of the present invention is a fabrication process flow for making a calibration wafer. This process flow begins with a bulk or epitaxial silicon wafer 300 (this wafer can also be fabricated from other semiconductor materials). Next, a layer of $SiO_2$ 302 (preferably approximately 1000 Å thick) is deposited on wafer 300 (by low pressure chemical vapor deposition, LPCVD; plasma enhanced chemical vapor deposition, PECVD; or thermal oxidation). This process step is optional and tile fabrication process flow may not use the initial oxide layer. In the third step, silicon nitride layer 304 (preferably between 1000 and 2500 Å) is deposited (by PCVD or PECVD). This layer will act as a diffusion barrier layer. In the fourth step, a layer of tungsten silicide 306 ($WSi_x$) is deposited (preferably by CVD). The layer thickness will preferably be in the range of approximately 1000 to 2500 Å. Next, the $WSi_x$ layer 306 is patterned by microlithography and etched in order to form the tungsten silicide resistor element array and the interconnects (collectively shown as region 308). In the next step, passivation overlayer 310, which is formed of silicon nitride or a bilayer of oxide/nitride (or oxynitride), is deposited (preferably by LPCVD or PECVD). This will protect the $WSi_x$ layer in reactive ambients. A thermal anneal process step (preferably at 1100° C. to 1500° C.) is performed next to stabilize the resistivity of $WSi_x$ sensing elements. The following step consists of patterning and etching the passivation overlayer to open bonding pads near the wafer edge (in the embodiment of FIG. 2 this would be at wafer edge 22) for the external interconnects to all the sensing elements. After the boding pads are exposed, wires are connected to the bonding pads by a suitable technique, preferably e-beam or laser welding.

Once the calibration wafer is connected to the external measurement equipment, a wafer temperature map is created by comparing measurements of the resistance values of the elements at certain temperatures to their room-temperature values. The equation used to compare these values is:

$$\frac{R(T)}{R(\text{Room Temp})} = \frac{\rho(T)}{\rho(\text{Room Temp})}$$

Thus, by measuring the ratio of the resistance values of each element at the process temperature and at the room temperature and using a pre-specified look-up table, the actual wafer temperature can be determined at the sensor element location at any time during a thermal heating cycle. The temperature map data obtained by the calibration wafer of this invention can be used to optimize the thermal process uniformity and/or to calibrate the fabrication equipment temperature sensors.

Although specific embodiments of the present invention are herein described, they are not to be construed as limiting the scope of the invention. Many embodiments of the present invention will become apparent to those skilled in the art in light of methodology of the specification. The scope of the invention is limited only by the claims appended.

What is claimed is:

1. A temperature sensor integrated into a semiconductor wafer such that said temperature sensor is integrated into said semiconductor wafer so that an electrical characteristic of said temperature sensor changes as the temperature of said semiconductor wafer changes, and said temperature sensor comprising:

a first conductor, formed from a first conductive material and having a width;

a second conductor, formed from said first conductive material and having a width approximately equal to the width of said first conductor; and a third conductor, formed from a second conductive material, disposed between said first and second conductors, and having a length and a width, said width of said third conductor being less then said width of said first or second conductors and much less then said length of said third conductor;

wherein the resistance of said third conductor is greater then the resistance of said first or second conductors, and a change in resistance of said first and second conductors due to temperature changes will be much less then the change in resistance of said third conductor due to said temperature change.

* * * * *